United States Patent
Sim-Tang

(10) Patent No.: US 8,650,167 B2
(45) Date of Patent: *Feb. 11, 2014

(54) METHOD AND SYSTEM FOR DATA REDUCTION

(75) Inventor: Siew Yong Sim-Tang, Saratoga, CA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,989

(22) Filed: Jun. 1, 2012

(65) Prior Publication Data

US 2012/0284238 A1   Nov. 8, 2012

Related U.S. Application Data

(63) Continuation of application No. 12/901,824, filed on Oct. 11, 2010, now Pat. No. 8,195,628, which is a continuation of application No. 10/943,541, filed on Sep. 17, 2004, now Pat. No. 7,979,404.

(51) Int. Cl.
*G06F 7/00* (2006.01)
*G06F 17/30* (2006.01)

(52) U.S. Cl.
USPC .......................................... 707/694

(58) Field of Classification Search
CPC ..................... G06F 7/00; G06F 17/30
See application file for complete search history.

(56) References Cited

U.S. PATENT DOCUMENTS

| | | | |
|---|---|---|---|
| 3,555,184 A | 1/1971 | Townley | |
| 3,555,195 A | 1/1971 | Rester et al. | |
| 3,555,204 A | 1/1971 | Braun | |
| 3,555,251 A | 1/1971 | Shavit | |
| 3,648,250 A | 3/1972 | Low et al. | |

(Continued)

FOREIGN PATENT DOCUMENTS

| WO | WO 98/19262 | 5/1998 |
|---|---|---|
| WO | WO 02/25443 | 3/2002 |
| WO | WO 03/060774 | 7/2003 |

OTHER PUBLICATIONS

Housel et al., "WebExpress: A client/intercept based system for optimizing Web browsing in a wireless environment", Mobile Networks and Applications, vol. 3, No. 4, pp. 419-431, 1998, Baltzer Science Publishers BV.*

(Continued)

*Primary Examiner* — Michael Hicks
(74) *Attorney, Agent, or Firm* — Winstead PC

(57) ABSTRACT

A "forward" delta data management technique uses a "sparse" index associated with a delta file to achieve both delta management efficiency and to eliminate read latency while accessing history data. The invention may be implemented advantageously in a data management system that provides real-time data services to data sources associated with a set of application host servers. A host driver embedded in an application server connects an application and its data to a cluster. The host driver captures real-time data transactions, preferably in the form of an event journal that is provided to the data management system. In particular, the driver functions to translate traditional file/database/block I/O into a continuous, application-aware, output data stream. A given application-aware data stream is processed through a multi-stage data reduction process to produce a compact data representation from which an "any point-in-time" reconstruction of the original data can be made.

20 Claims, 9 Drawing Sheets

(56) References Cited

U.S. PATENT DOCUMENTS

| | | | |
|---|---|---|---|
| 4,162,536 | A | 7/1979 | Morley |
| 4,402,045 | A | 8/1983 | Krol |
| 4,415,792 | A | 11/1983 | Jordan |
| 4,450,556 | A | 5/1984 | Boleda et al. |
| 4,451,108 | A | 5/1984 | Skidmore |
| 4,455,483 | A | 6/1984 | Schonhuber |
| 4,502,082 | A | 2/1985 | Ragle et al. |
| 4,512,020 | A | 4/1985 | Krol et al. |
| 4,796,260 | A | 1/1989 | Schilling et al. |
| 4,882,737 | A | 11/1989 | Dzung |
| 4,916,450 | A | 4/1990 | Davis |
| 4,972,474 | A | 11/1990 | Sabin |
| 5,005,197 | A | 4/1991 | Parsons et al. |
| 5,148,479 | A | 9/1992 | Bird et al. |
| 5,177,796 | A | 1/1993 | Feig et al. |
| 5,224,212 | A | 6/1993 | Rosenthal et al. |
| 5,274,508 | A | 12/1993 | Tan et al. |
| 5,280,584 | A | 1/1994 | Caesar et al. |
| 5,287,504 | A | 2/1994 | Carpenter et al. |
| 5,303,393 | A | 4/1994 | Noreen et al. |
| 5,305,326 | A | 4/1994 | Solomon et al. |
| 5,311,197 | A | 5/1994 | Sorden et al. |
| 5,319,395 | A | 6/1994 | Larky et al. |
| 5,321,699 | A | 6/1994 | Endoh et al. |
| 5,363,371 | A | 11/1994 | Roy et al. |
| 5,365,516 | A | 11/1994 | Jandrell |
| 5,373,372 | A | 12/1994 | Loewen |
| 5,377,102 | A | 12/1994 | Nishiishigaki |
| 5,382,508 | A | 1/1995 | Ikenoue |
| 5,386,422 | A | 1/1995 | Endoh et al. |
| 5,387,994 | A | 2/1995 | McCormack et al. |
| 5,388,074 | A | 2/1995 | Buckenmaier |
| 5,392,209 | A | 2/1995 | Eason et al. |
| 5,396,600 | A | 3/1995 | Thompson et al. |
| 5,416,831 | A | 5/1995 | Chewning, III et al. |
| 5,424,778 | A | 6/1995 | Sugiyama et al. |
| 5,430,830 | A | 7/1995 | Frank et al. |
| 5,440,686 | A | 8/1995 | Dahman et al. |
| 5,469,444 | A | 11/1995 | Endoh et al. |
| 5,477,492 | A | 12/1995 | Ohsaki et al. |
| 5,479,654 | A | 12/1995 | Squibb |
| 5,481,531 | A | 1/1996 | Yamamuro |
| 5,499,512 | A | 3/1996 | Jurewicz et al. |
| 5,502,491 | A | 3/1996 | Sugiyama et al. |
| 5,506,965 | A | 4/1996 | Naoe |
| 5,507,024 | A | 4/1996 | Richards, Jr. |
| 5,511,212 | A | 4/1996 | Rockoff |
| 5,526,357 | A | 6/1996 | Jandrell |
| 5,537,945 | A | 7/1996 | Sugihara et al. |
| 5,560,033 | A | 9/1996 | Doherty et al. |
| 5,561,671 | A | 10/1996 | Akiyama |
| 5,583,975 | A | 12/1996 | Naka et al. |
| 5,602,638 | A | 2/1997 | Boulware |
| 5,606,601 | A | 2/1997 | Witzman et al. |
| 5,640,159 | A | 6/1997 | Furlan et al. |
| 5,644,763 | A | 7/1997 | Roy |
| 5,651,129 | A | 7/1997 | Yokote et al. |
| 5,657,398 | A | 8/1997 | Guilak |
| 5,678,042 | A | 10/1997 | Pisello et al. |
| 5,684,536 | A | 11/1997 | Sugiyama et al. |
| 5,684,693 | A | 11/1997 | Li |
| 5,684,774 | A | 11/1997 | Yamamuro |
| 5,724,241 | A | 3/1998 | Wood et al. |
| 5,729,743 | A | 3/1998 | Squibb |
| 5,737,399 | A | 4/1998 | Witzman et al. |
| 5,742,509 | A | 4/1998 | Goldberg et al. |
| 5,742,915 | A | 4/1998 | Stafford |
| 5,754,772 | A | 5/1998 | Leaf |
| 5,764,691 | A | 6/1998 | Hennedy et al. |
| 5,768,159 | A | 6/1998 | Belkadi et al. |
| 5,778,370 | A | 7/1998 | Emerson |
| 5,781,612 | A | 7/1998 | Choi et al. |
| 5,784,366 | A | 7/1998 | Apelewicz |
| 5,794,252 | A | 8/1998 | Bailey et al. |
| 5,805,155 | A | 9/1998 | Allibhoy et al. |
| 5,812,130 | A | 9/1998 | Van Huben et al. |
| RE35,920 | E | 10/1998 | Sorden et al. |
| 5,819,020 | A | 10/1998 | Beeler, Jr. |
| 5,822,749 | A | 10/1998 | Agarwal |
| 5,826,265 | A | 10/1998 | Van Huben et al. |
| 5,831,903 | A | 11/1998 | Ohuchi et al. |
| 5,841,717 | A | 11/1998 | Yamaguchi |
| 5,841,771 | A | 11/1998 | Irwin et al. |
| 5,848,072 | A | 12/1998 | Prill et al. |
| 5,854,834 | A | 12/1998 | Gottlieb et al. |
| 5,862,136 | A | 1/1999 | Irwin |
| 5,864,875 | A | 1/1999 | Van Huben et al. |
| 5,877,742 | A | 3/1999 | Klink |
| 5,878,408 | A | 3/1999 | Van Huben et al. |
| 5,893,119 | A | 4/1999 | Squibb |
| 5,894,494 | A | 4/1999 | Davidovici |
| 5,909,435 | A | 6/1999 | Apelewicz |
| 5,915,251 | A * | 6/1999 | Burrows et al. ............... 707/700 |
| 5,917,429 | A | 6/1999 | Otis et al. |
| 5,918,248 | A | 6/1999 | Newell et al. |
| 5,920,867 | A | 7/1999 | Van Huben et al. |
| 5,920,873 | A | 7/1999 | Van Huben et al. |
| 5,928,327 | A | 7/1999 | Wang et al. |
| 5,930,732 | A | 7/1999 | Domanik et al. |
| 5,930,762 | A | 7/1999 | Masch |
| 5,931,928 | A | 8/1999 | Brennan et al. |
| 5,937,168 | A | 8/1999 | Anderson et al. |
| 5,940,823 | A | 8/1999 | Schreiber et al. |
| 5,950,201 | A | 9/1999 | Van Huben et al. |
| 5,953,729 | A | 9/1999 | Cabrera et al. |
| 5,958,010 | A | 9/1999 | Agarwal et al. |
| 5,966,707 | A | 10/1999 | Van Huben et al. |
| 5,974,563 | A | 10/1999 | Beeler, Jr. |
| 5,980,096 | A | 11/1999 | Thalhammer-Reyero |
| 5,999,562 | A | 12/1999 | Hennedy et al. |
| 6,005,846 | A | 12/1999 | Best et al. |
| 6,005,860 | A | 12/1999 | Anderson et al. |
| 6,031,848 | A | 2/2000 | Brennan |
| 6,035,297 | A | 3/2000 | Van Huben et al. |
| 6,047,323 | A | 4/2000 | Krause |
| 6,065,018 | A | 5/2000 | Beier et al. |
| 6,072,185 | A | 6/2000 | Arai et al. |
| 6,088,693 | A | 7/2000 | Van Huben et al. |
| 6,094,654 | A | 7/2000 | Van Huben et al. |
| 6,108,318 | A | 8/2000 | Kolev et al. |
| 6,108,410 | A | 8/2000 | Reding et al. |
| 6,154,847 | A | 11/2000 | Schofield et al. |
| 6,158,019 | A | 12/2000 | Squibb |
| 6,163,856 | A | 12/2000 | Dion et al. |
| 6,178,121 | B1 | 1/2001 | Maruyama |
| 6,181,609 | B1 | 1/2001 | Muraoka |
| 6,189,016 | B1 | 2/2001 | Cabrera et al. |
| 6,237,122 | B1 | 5/2001 | Maki |
| 6,243,348 | B1 | 6/2001 | Goodberlet |
| 6,249,824 | B1 | 6/2001 | Henrichs |
| 6,366,926 | B1 | 4/2002 | Pohlmann et al. |
| 6,366,988 | B1 | 4/2002 | Skiba et al. |
| 6,389,427 | B1 | 5/2002 | Faulkner |
| 6,393,582 | B1 | 5/2002 | Klecka et al. |
| 6,397,242 | B1 | 5/2002 | Devine et al. |
| 6,446,136 | B1 | 9/2002 | Pohlmann et al. |
| 6,460,055 | B1 | 10/2002 | Midgley et al. |
| 6,463,565 | B1 | 10/2002 | Kelly et al. |
| 6,487,561 | B1 | 11/2002 | Ofek et al. |
| 6,487,581 | B1 | 11/2002 | Spence et al. |
| 6,496,944 | B1 | 12/2002 | Hsiao et al. |
| 6,502,133 | B1 | 12/2002 | Baulier et al. |
| 6,519,612 | B1 | 2/2003 | Howard et al. |
| 6,526,418 | B1 | 2/2003 | Midgley et al. |
| 6,549,916 | B1 | 4/2003 | Sedlar |
| 6,611,867 | B1 | 8/2003 | Bowman-Amuah |
| 6,625,623 | B1 | 9/2003 | Midgley et al. |
| 6,629,109 | B1 | 9/2003 | Koshisaka |
| 6,640,145 | B2 | 10/2003 | Hoffberg |
| 6,670,974 | B1 | 12/2003 | McKnight et al. |
| RE38,410 | E | 1/2004 | Hersch et al. |
| 6,751,753 | B2 | 6/2004 | Nguyen et al. |
| 6,769,074 | B2 | 7/2004 | Vaitzblit |
| 6,779,003 | B1 | 8/2004 | Midgley et al. |

(56) References Cited

U.S. PATENT DOCUMENTS

| | | | |
|---|---|---|---|
| 6,785,786 B1 | 8/2004 | Gold et al. | |
| 6,807,550 B1 | 10/2004 | Li et al. | |
| 6,816,872 B1 * | 11/2004 | Squibb | 1/1 |
| 6,823,336 B1 | 11/2004 | Srinivasan et al. | |
| 6,826,711 B2 | 11/2004 | Moulton et al. | |
| 6,836,756 B1 | 12/2004 | Gruber | |
| 6,839,721 B2 | 1/2005 | Schwols | |
| 6,839,740 B1 | 1/2005 | Kiselev | |
| 6,847,984 B1 | 1/2005 | Midgley et al. | |
| 6,907,551 B2 | 6/2005 | Katagiri et al. | |
| 6,941,310 B2 | 9/2005 | Ahad et al. | |
| 6,968,464 B2 | 11/2005 | Gardiner et al. | |
| 6,983,286 B1 | 1/2006 | Sinha et al. | |
| 6,993,706 B2 | 1/2006 | Cook | |
| 7,003,688 B1 | 2/2006 | Pittelkow et al. | |
| 7,028,078 B1 | 4/2006 | Sharma et al. | |
| 7,039,663 B1 | 5/2006 | Federwisch et al. | |
| 7,054,913 B1 | 5/2006 | Kiselev | |
| 7,069,579 B2 | 6/2006 | Delpuch | |
| 7,080,081 B2 | 7/2006 | Agarwal et al. | |
| 7,092,396 B2 | 8/2006 | Lee et al. | |
| 7,096,392 B2 | 8/2006 | Sim-Tang | |
| 7,200,233 B1 | 4/2007 | Keller et al. | |
| 7,206,805 B1 | 4/2007 | McLaughlin et al. | |
| 7,207,224 B2 | 4/2007 | Rutt et al. | |
| 7,272,613 B2 | 9/2007 | Sim et al. | |
| 7,290,056 B1 | 10/2007 | McLaughlin et al. | |
| 7,325,159 B2 | 1/2008 | Stager et al. | |
| 7,363,549 B2 | 4/2008 | Sim-Tang | |
| 7,519,870 B1 | 4/2009 | Sim-Tang | |
| 7,526,541 B2 | 4/2009 | Roese et al. | |
| 7,565,661 B2 | 7/2009 | Sim-Tang | |
| 7,680,834 B1 | 3/2010 | Sim-Tang | |
| 7,689,602 B1 | 3/2010 | Sim-Tang | |
| 7,788,521 B1 | 8/2010 | Sim-Tang | |
| 7,904,913 B2 | 3/2011 | Sim-Tang et al. | |
| 7,979,404 B2 | 7/2011 | Sim-Tang | |
| 7,979,441 B2 | 7/2011 | Sim-Tang | |
| 8,060,889 B2 | 11/2011 | Sim-Tang | |
| 8,094,647 B2 | 1/2012 | Elliott et al. | |
| 8,108,429 B2 | 1/2012 | Sim-Tang et al. | |
| 8,131,723 B2 | 3/2012 | Sim-Tang | |
| 8,151,140 B2 | 4/2012 | Sim-Tang | |
| 8,195,628 B2 | 6/2012 | Sim-Tang | |
| 8,200,706 B1 | 6/2012 | Sim-Tang | |
| 2001/0029520 A1 | 10/2001 | Miyazaki et al. | |
| 2001/0043522 A1 | 11/2001 | Park | |
| 2001/0056362 A1 | 12/2001 | Hanagan et al. | |
| 2002/0022982 A1 | 2/2002 | Cooperstone et al. | |
| 2002/0064149 A1 | 5/2002 | Elliott et al. | |
| 2002/0091722 A1 | 7/2002 | Gupta et al. | |
| 2002/0107860 A1 | 8/2002 | Gobeille et al. | |
| 2002/0144177 A1 | 10/2002 | Kondo et al. | |
| 2002/0147807 A1 | 10/2002 | Raguseo | |
| 2002/0172222 A1 | 11/2002 | Ullmann et al. | |
| 2002/0178397 A1 | 11/2002 | Ueno et al. | |
| 2002/0199152 A1 | 12/2002 | Garney et al. | |
| 2003/0004947 A1 | 1/2003 | Coverston | |
| 2003/0009552 A1 | 1/2003 | Benfield et al. | |
| 2003/0051026 A1 | 3/2003 | Carter et al. | |
| 2003/0088372 A1 | 5/2003 | Caulfield | |
| 2003/0117916 A1 | 6/2003 | Makela et al. | |
| 2003/0200098 A1 | 10/2003 | Geipel et al. | |
| 2003/0204515 A1 | 10/2003 | Shadmon et al. | |
| 2003/0225825 A1 | 12/2003 | Healey et al. | |
| 2004/0010544 A1 | 1/2004 | Slater et al. | |
| 2004/0036716 A1 | 2/2004 | Jordahl | |
| 2004/0047354 A1 | 3/2004 | Slater et al. | |
| 2004/0080504 A1 | 4/2004 | Salesky et al. | |
| 2004/0098458 A1 | 5/2004 | Husain et al. | |
| 2004/0098717 A1 | 5/2004 | Husain et al. | |
| 2004/0098728 A1 | 5/2004 | Husain et al. | |
| 2004/0098729 A1 | 5/2004 | Husain et al. | |
| 2004/0117715 A1 | 6/2004 | Ha et al. | |
| 2004/0133487 A1 | 7/2004 | Hanagan et al. | |
| 2004/0193594 A1 | 9/2004 | Moore et al. | |
| 2004/0199486 A1 | 10/2004 | Gopinath et al. | |
| 2004/0250212 A1 | 12/2004 | Fish | |
| 2005/0001911 A1 | 1/2005 | Suzuki | |
| 2005/0021690 A1 | 1/2005 | Peddada | |
| 2005/0076066 A1 | 4/2005 | Stakutis et al. | |
| 2005/0166179 A1 | 7/2005 | Vronay et al. | |
| 2005/0240592 A1 | 10/2005 | Mamou et al. | |
| 2005/0251540 A1 | 11/2005 | Sim-Tang | |
| 2005/0262097 A1 | 11/2005 | Sim-Tang et al. | |
| 2005/0262188 A1 | 11/2005 | Mamou et al. | |
| 2005/0286440 A1 | 12/2005 | Strutt et al. | |
| 2006/0020586 A1 | 1/2006 | Prompt et al. | |
| 2006/0026220 A1 | 2/2006 | Margolus | |
| 2006/0050970 A1 | 3/2006 | Gunatilake | |
| 2006/0101384 A1 | 5/2006 | Sim-Tang et al. | |
| 2006/0130002 A1 | 6/2006 | Hirayama et al. | |
| 2006/0137024 A1 | 6/2006 | Kim et al. | |
| 2006/0236149 A1 | 10/2006 | Nguyen et al. | |
| 2006/0259820 A1 | 11/2006 | Swoboda | |
| 2006/0278004 A1 | 12/2006 | Rutt et al. | |
| 2007/0067278 A1 | 3/2007 | Borodziewicz et al. | |
| 2007/0094312 A1 | 4/2007 | Sim-Tang | |
| 2007/0168692 A1 | 7/2007 | Quintiliano | |
| 2007/0185922 A1 | 8/2007 | Kapoor et al. | |
| 2007/0214191 A1 | 9/2007 | Chandrasekaran | |
| 2010/0198788 A1 | 8/2010 | Sim-Tang | |
| 2011/0252004 A1 | 10/2011 | Sim-Tang | |
| 2011/0252432 A1 | 10/2011 | Sim-Tang et al. | |
| 2012/0254659 A1 | 10/2012 | Sim-Tang | |
| 2012/0266019 A1 | 10/2012 | Sim-Tang | |

OTHER PUBLICATIONS

Psounis, "Class-based Delta-encoding: A Scalable Scheme for Caching Dynamic Web Content", Proceedings of the 22 nd International Conference on Distributed Computing Systems Workshops, 2002 IEEE).*

Reichenberger, "Delta Storage for Arbitrary Non-Text Files", SCM '91 Proceedings of the 3rd international workshop on Software configuration management, pp. 144-152, ACM, 1991.*

Otlu, "A New Technique: Replace Algorithm to Retrieve a Version from a Repository Instead od Delta Application", Thesis, The Graduate School of Natural and Applied Sciences, The Middle East Technical University, 2004.*

Kurtz et al., "Delta Compression Algorithms for Diverse Environments".*

Psounis, "Class-based Delta-encoding: A Scalable Scheme for Caching Dynamic Web Content", Proceedings of the 22 nd International Conference on Distributed Computing Systems Workshops, 2002 IEEE.*

U.S. Appl. No. 12/099,837, filed Apr. 9, 2008, Sim-Tang, Siew Yong.

U.S. Appl. No. 13/242,916, filed Sep. 23, 2011, Sim-Tang, Siew Yong.

U.S. Appl. No. 13/436,624, filed Mar. 30, 2012, Sim-Tang, Siew Yong.

U.S. Appl. No. 13/489,751, filed Jun. 6, 2012, Sim-Tang, Siew Yong.

Bloom, Burton H., Space/Time Trade-offs in Hash Coding with Allowable Errors, Communications of the ACM, vol. 13, No. 7, Jul. 1970, pp. 422-426.

Housel, et al., "WebExpress: A client/intercept based system for optimizing Web browsing in a wireless environment", Mobile Network and Applications, vol. 3, pp. 419-431, 1998, Baltzer Science Publishers.

International Preliminary Report and Written Opinion for PCT/US05/15651 (Beausoliel, Rob) mailed Sep. 29, 2005 (13 pages).

International Preliminary Report and Written Opinion for PCT/US05/15653 (Zhen, Li B.) mailed Nov. 30, 2006 (13 pages).

International Preliminary Report and Written Opinion for PCT/US05/15662 (Vo, Tim) mailed Feb. 1, 2008 (11 pages).

International Preliminary Report and Written Opinion for PCT/US05/32958 (Abel-Jalil, Neveen) mailed Jul. 8, 2008 (8 pages).

International Preliminary Report and Written Opinion for PCT/US05/39709 (Thomson, William) mailed Oct. 16, 2007 (7 pages).

(56) References Cited

OTHER PUBLICATIONS

Microsoft Windows Storage Server 2003, NSI Software, "Improving Business Continuity Using Windows Storage Server 2003", White Paper, Oct. 2003, pp. 1-15.

Plagemann, Thomas, Towards Middleware Services for Mobile ADHOC Network Applications, May 2003, IEEE (FTDCS'03), pp. 1-7.

Psounis, "Class-based Delta-encoding: A Scalable Scheme for Caching Dynamic Web Content", Proceedings of the 22nd International Conference on Distributed Computing Systems Workshops, 2002 IEEE (pp. 1-7).

U.S. Appl. No. 13/752,020, Siew Yong Sim-Tang.
U.S. Appl. No. 13/721,588, Siew Yong Sim-Tang.
U.S. Appl. No. 13/714,829, Sim-Tang.

* cited by examiner

SECOND-STAGE DELTA REDUCTION PROCESS

METHOD AND SYSTEM FOR DATA REDUCTION

CROSS-REFERENCE TO RELATED APPLICATIONS

The present application is a continuation of U.S. patent application Ser. No. 12/901,824, filed on Oct. 11, 2010, which is a continuation of U.S. patent application Ser. No. 10/943, 541, filed on Sep. 17, 2004, now U.S. Pat. No. 7,979,404, issued Jul. 12, 2011, each of which is hereby incorporated herein by reference in its entirety. The present application is related to commonly-owned U.S. Pat. No. 7,096,392, issued Aug. 22, 2006 and U.S. Pat. No. 7,565,661, issued Jul. 21, 2009, each of which is hereby incorporated herein by reference in its entirety.

BACKGROUND OF THE INVENTION

1. Technical Field

The present invention relates generally to enterprise data protection and data management.

2. Background of the Related Art

Techniques for managing data history in distributed computing systems are known in the art. In particular, traditional content management systems typically manage file history by using either "forward delta" management, "reverse delta" management, or a combination of both techniques. A forward delta management system maintains an initial baseline of the file as well as a list of deltas (changes to the file) that occur after the baseline is created. In a forward delta management system, deltas are appended to a delta document sequentially. An advantage of such a system is that, as deltas arrive, the system only needs to append them to an end of a delta document. However, when a user tries to access a file (or when a host needs to recover its lost data to a specific point-in-time, version, or the most current point-in-time), the forward delta management system must (at runtime) take the baseline and apply the necessary delta strings "on the fly" to generate the requested point-in-time data. If there is a long list of delta strings, the read latency of such an operation may be very long; in addition, the cache required to process the delta strings during the read operation may be unacceptably high.

A reverse delta management system maintains the most current point-in-time data and a list of reverse deltas (an "undo" list) in a delta management file. A reverse delta management system first takes a given forward delta and applies the delta to last point-in-time data to generate the most current point-in-time data; it then uses the most current point-in-time data to compare with the last point-in-time data to generate an undo (reverse) delta. This type of system only keeps the most current data file and a list of undo deltas. If the most current data is requested, the data can be retrieved instantly. If, however, data from a previous point-in-time is requested, this system must take the most current data file and apply the necessary undo delta(s) to generate the requested point-in-time data. The baseline copy in this system is the most current point-in-time copy. In many cases, there may be a significant read latency for previous data. In addition, the computing power needed for ongoing data updates in such a data management system is very significant. This technique also does not support data replication over an unreliable network, as the baseline copy of the data is constantly changing.

When performing incremental data protection, traditional data management systems copy the entire contents of a changed file into a protection repository, where the file history is saved. These systems, however, do not apply any delta management techniques, such as those described above, to manage the file history. Moreover, because these systems are not storage and bandwidth efficient, they are not suitable for performing real-time data services.

The traditional content management systems can manage file history, but they are not capable of managing unstructured and dynamic data. Further, a traditional system of this type requires that its data source be well-structured, i.e., having directories that are created and configured in advance. In most cases, a given content management system is designed to manage a specific content type as opposed to dynamic data. Thus, for example, a given source control system may be designed to manage design documents or source code, but that same system cannot manage data that changes constantly. These systems also are not capable of protecting changing data in real-time. To the extent they include delta management schemes, such schemes do not enable efficient any-point-in-time data recovery.

There remains a need in the art to provide distributed data management systems that can efficiently manage real-time history of a large amount of unstructured and dynamic data with minimal storage and bandwidth usage.

There also remains a need in the art to provide such a distributed data management system that can perform virtual-on-demand recovery of consistent data at any point-in-time in the past.

The present invention addresses these deficiencies in the art.

SUMMARY OF THE INVENTION

It is a general object of the present invention to provide for efficient transfer of real-time data changes over a local and/or wide area network.

It is also a general object of the invention to provide for efficient storage of data history over a given time period.

It is a more specific object of the present invention to provide novel data reduction techniques that facilitate any-point-in-time virtual on-demand data recovery in a data management system.

A specific object of the invention is to implement an improved "forward" delta data management technique wherein a "sparse" index is associated with a delta file to achieve both delta management efficiency and to eliminate read latency while accessing history data of any point-in-time.

Another more specific object of the present invention is to provide a novel data management technique to create a given data structure for use in managing data history for a file that is constantly changing. According to the invention, the given data structure need not include the actual contents of later-created versions of a particular file as that file is updated in the system. Nevertheless, the information in the given data structure is such that each of the given versions can be readily reconstructed "on-the-fly" (as-needed) without extensive read latency to apply deltas to the baseline data.

The present invention may be implemented advantageously in a data management system or "DMS" that provides a wide range of data services to data sources associated with a set of application host servers. The data management system typically comprises one or more regions, with each region having one or more clusters. A given cluster has one or more nodes that share storage. To facilitate a given data service, a host driver embedded in an application server connects an application and its data to a cluster. The host driver captures real-time data transactions, preferably in the form of an event journal that is provided to the data management system.

In particular, the driver functions to translate traditional file/database/block I/O into a continuous, application-aware, output data stream. Application aware event journaling is a technique to create real-time data capture so that, among other things, consistent data checkpoints of an application can be identified and metadata can be extracted. Application aware event journaling tracks granular application consistent checkpoints. Thus, when a DMS is used to provide file system data protection to a given data source, it is capable of reconstructing an application data state to a consistent point-in-time in the past.

According to an illustrative embodiment, a given application aware data stream is processed through a multi-stage data reduction process to produce a compact data representation from which an "any point-in-time" reconstruction of the original data can be made.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
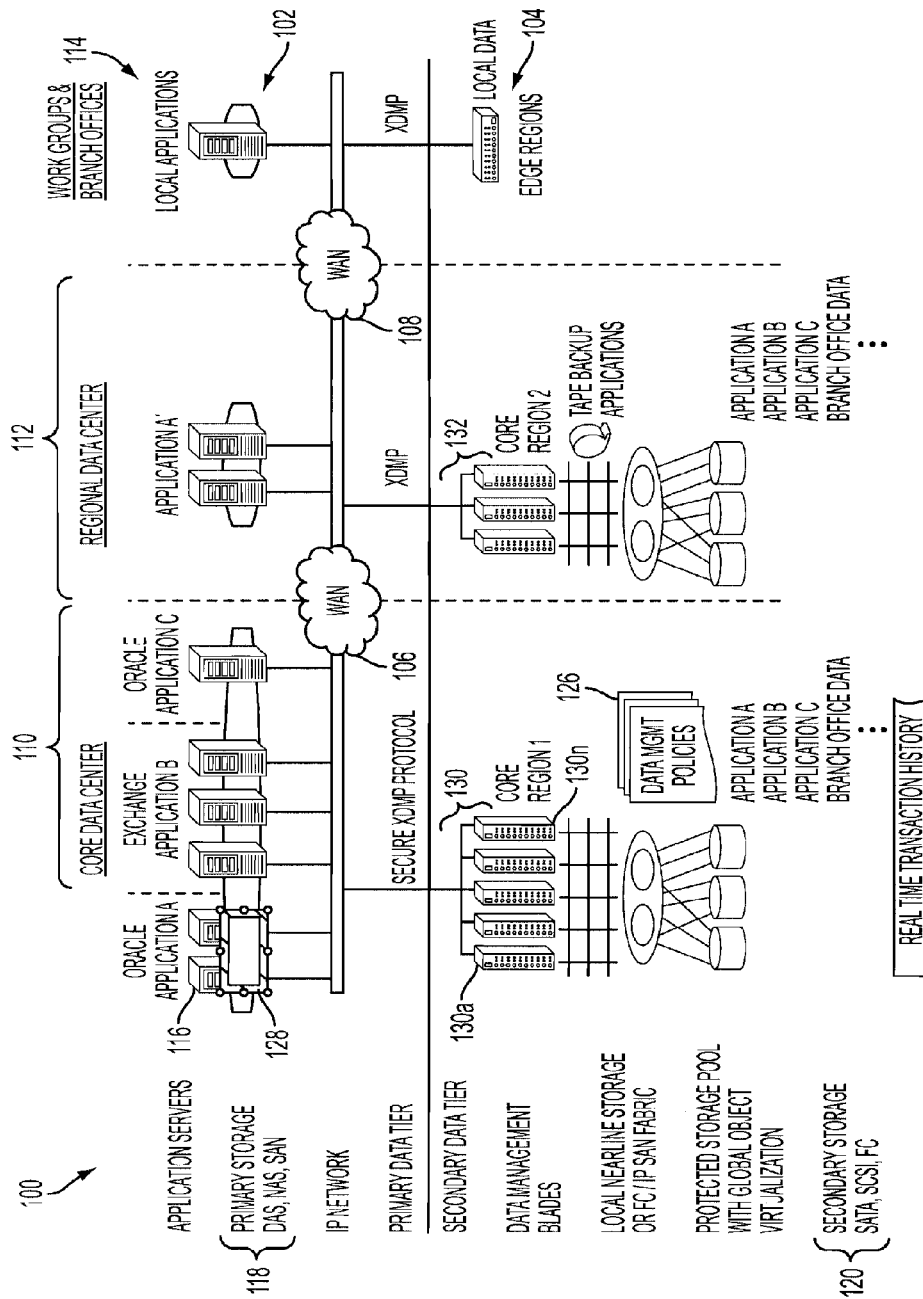
FIG. 1 is an illustrative enterprise network in which the present invention may be deployed.

FIG. 1 illustrates a representative enterprise 100 in which the present invention may be implemented. This architecture is meant to be taken by way of illustration and not to limit the applicability of the present invention. In this illustrative example, the enterprise 100 comprises a primary data tier 102 and a secondary data tier 104 distributed over IP-based wide area networks 106 and 108. Wide area network 106 interconnects two primary data centers 110 and 112, and wide area network 108 interconnects a regional or satellite office 114 to the rest of the enterprise. The primary data tier 102 comprises application servers 116 running various applications such as databases, email servers, file servers, and the like, together with associated primary storage 118 (e.g., direct attached storage (DAS), network attached storage (NAS), storage area network (SAN)). The secondary data tier 104 typically comprises one or more data management server nodes, and secondary storage 120, which may be DAS, NAS, and SAN. The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers (as described below) to provide real-time data services. Preferably, and as described below, the real-time data services are provided through a given I/O protocol for data transfer. Data management policies 126 are implemented across the secondary storage in a well-known manner. A similar architecture is provided in data center 112. In this example, the regional office 114 does not have its own secondary storage, but relies instead on the facilities in the primary data centers.

As illustrated in commonly-owned, U.S. Pat. No. 7,565,661, issued Jul. 21, 2009, a "host driver" 128 is associated with one or more of the application(s) running in the application servers 116 to transparently and efficiently capture the real-time, continuous history of all (or substantially all) transactions and changes to data associated with such application(s) across the enterprise network. As will be described below, this facilitates real-time, so-called "application aware" protection, with substantially no data loss, to provide continuous data protection and other data services including, without limitation, data distribution, data replication, data copy, data access, and the like. In operation, a given host driver 128 intercepts data events between an application and its primary data storage, and it may also receive data and application events directly from the application and database. In a representative embodiment, the host driver 128 is embedded in the host application server 116 where the application resides; alternatively, the host driver is embedded in the network on the application data path. By intercepting data through the application, fine grain (but opaque) data is captured to facilitate the data service(s). To this end, and as also illustrated in FIG. 1, each of the primary data centers includes a set of one or more data management servers 130a-n that cooperate with the host drivers 128 to facilitate the data services. In this illustrative example, the data center 110 supports a first core region 130, and the data center 112 supports a second core region 132. A given data management server 130 is implemented using commodity hardware and software (e.g., an Intel processor-based blade server running Linux operating system, or the like) and having associated disk storage and memory. Generalizing, the host drivers 128 and data management servers 130 comprise a data management system (DMS) that provides potentially global data services across the enterprise.

Figure 2:
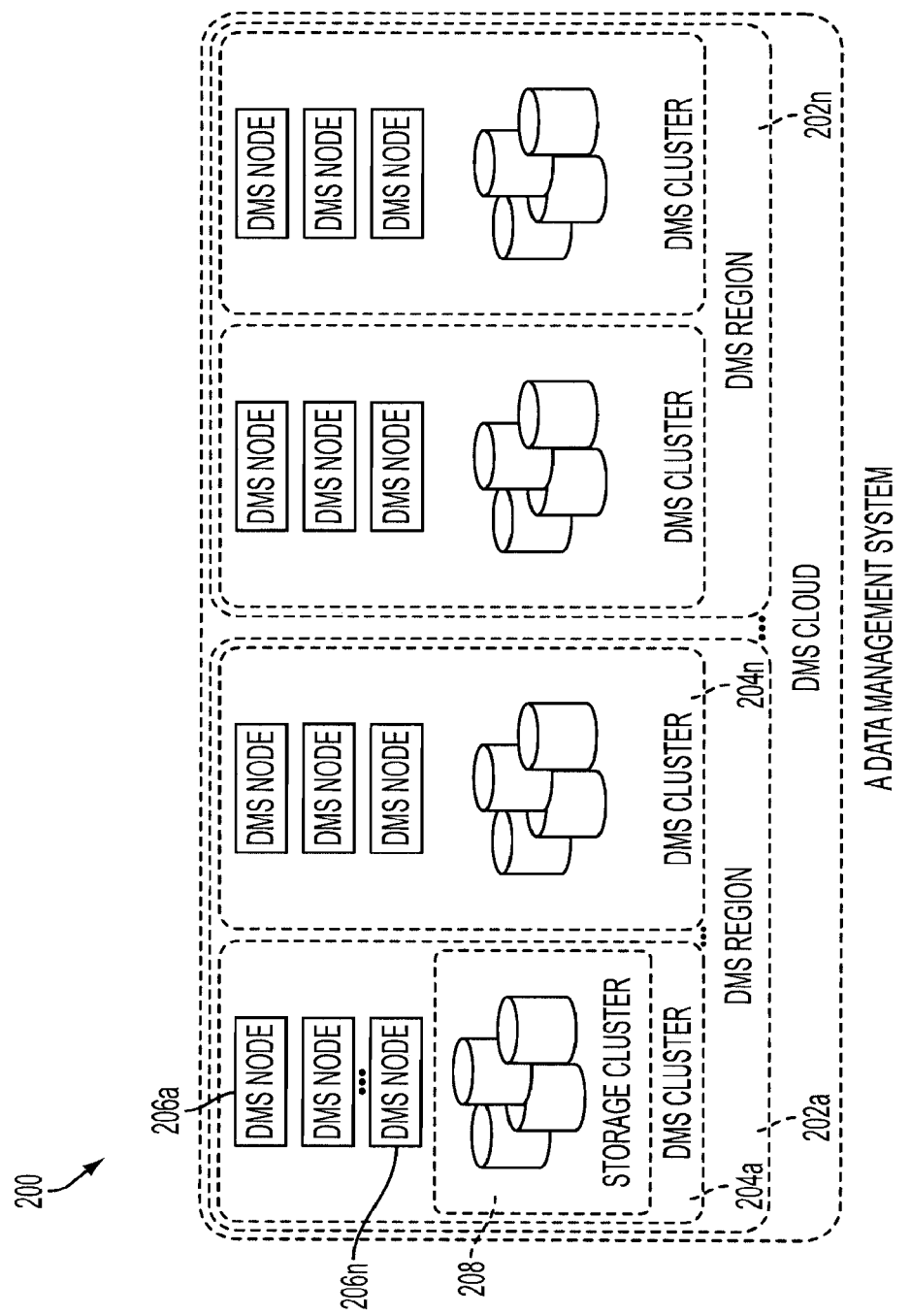
FIG. 2 is an illustration of a general data management system (DMS)

FIG. 2 illustrates a preferred hierarchical structure of a data management system 200. As illustrated, the data management system 200 comprises one or more regions 202a-n, with each region 202 comprising one or more clusters 204a-n. A given cluster 204 includes one or more nodes 206a-n and a shared storage 208 shared by the nodes 206 within the cluster 204. A given node 206 is a data management server as described above with respect to FIG. 1. Within a DMS cluster 204, preferably all the nodes 206 perform parallel access to the data in the shared storage 208. Preferably, the nodes 206 are hot swappable to enable new nodes to be added and existing nodes to be removed without causing cluster downtime. Preferably, a cluster is a tightly-coupled, share everything grouping of nodes. At a higher level, the DMS is a loosely-coupled share nothing grouping of DMS clusters. Preferably, all DMS clusters have shared knowledge of the entire network, and all clusters preferably share partial or summary information about the data that they possess. Network connections (e.g., sessions) to one DMS node in a DMS cluster may be redirected to another DMS node in another cluster when data is not present in the first DMS cluster but may be present in the second DMS cluster. Also, new DMS clusters may be added to the DMS cloud without interfering with the operation of the existing DMS clusters. When a DMS cluster fails, its data may be accessed in another cluster transparently, and its data service responsibility may be passed on to another DMS cluster.

Figure 3:
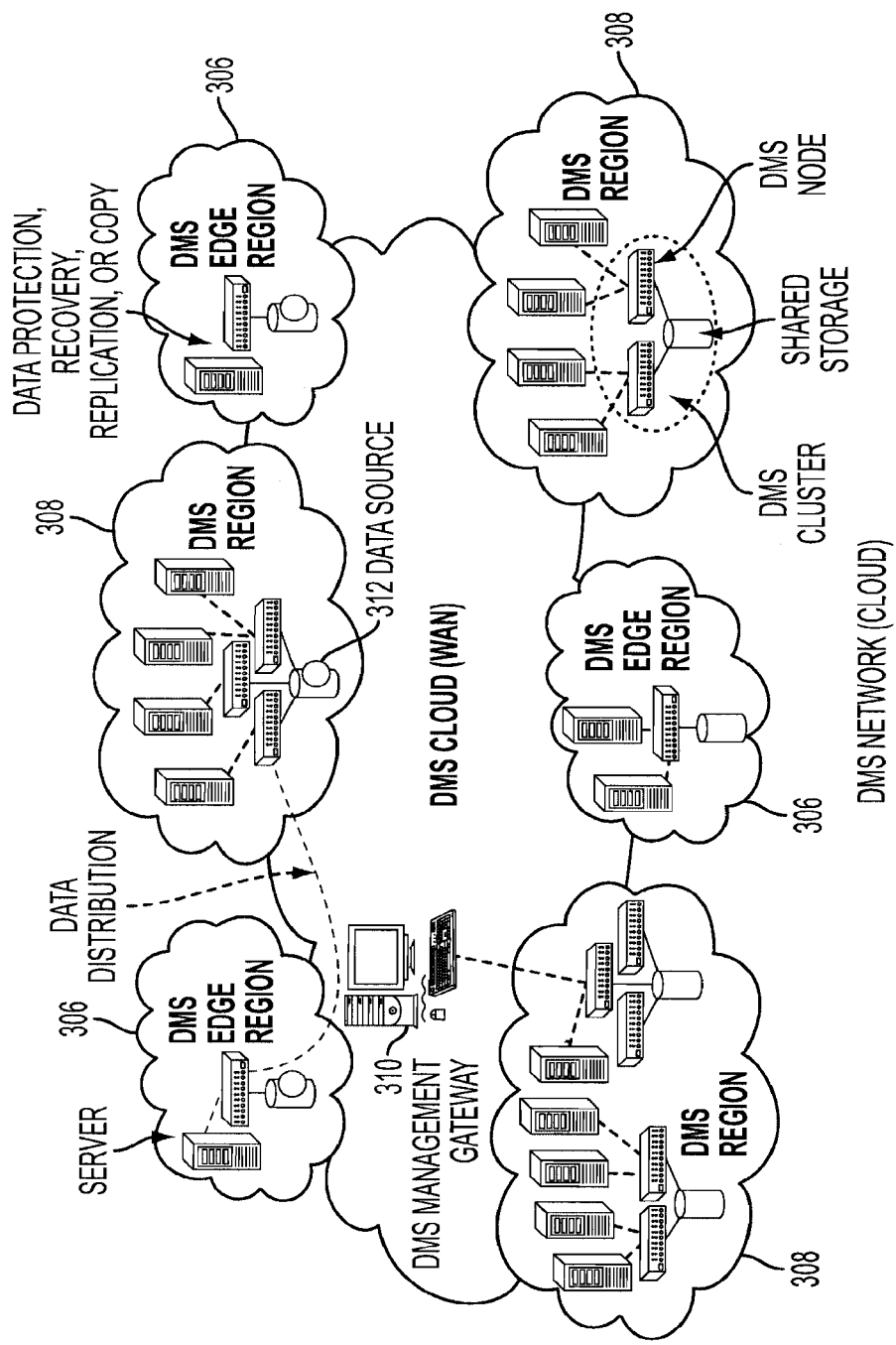
FIG. 3 is an illustration of a representative DMS network.

FIG. 3 illustrates the data management system (DMS) as a network (in effect, a wide area network "cloud") of peer-to-peer DMS service nodes. As discussed above with respect to FIG. 2, the DMS cloud 300 typically comprises one or more DMS regions, with each region comprising one or more DMS "clusters." In the illustrative embodiment of FIG. 3, typically there are two different types of DMS regions, in this example an "edge" region 306 and a "core" region 308. This nomenclature is not to be taken to limit the invention, of course. As illustrated in FIG. 1, an edge region 306 typically is a smaller office or data center where the amount of data hosted is limited and/or where a single node DMS cluster is sufficient to provide necessary data services. Typically, core regions 308 are medium or large size data centers where one or more multi-node clusters are required or desired to provide the necessary data services. The DMS preferably also includes one or more management gateways 310 for controlling the system. As seen in FIG. 3, conceptually the DMS can be visualized as a set of DMS data sources 312. A data source is a representation of a related group of fine grain data. For example, a data source may be a directory of files and subdirectory, or it may be a database, or a combination of both. A DMS data source 312 inside a DMS cluster captures a range of history and continuous changes of, for example, an external host data source in a host server. A DMS data source may reside in one cluster, and it may replicate to other clusters or regions based on subscription rules. If a DMS data source exists in the storage of a DMS cluster, preferably it can be accessed through any one of the DMS nodes in that cluster. If a DMS data source does not exist in a DMS cluster, then the requesting session may be redirected to another DMS cluster that has the data; alternatively, the current DMS cluster may perform an on-demand replication to bring in the data.

Figure 4:
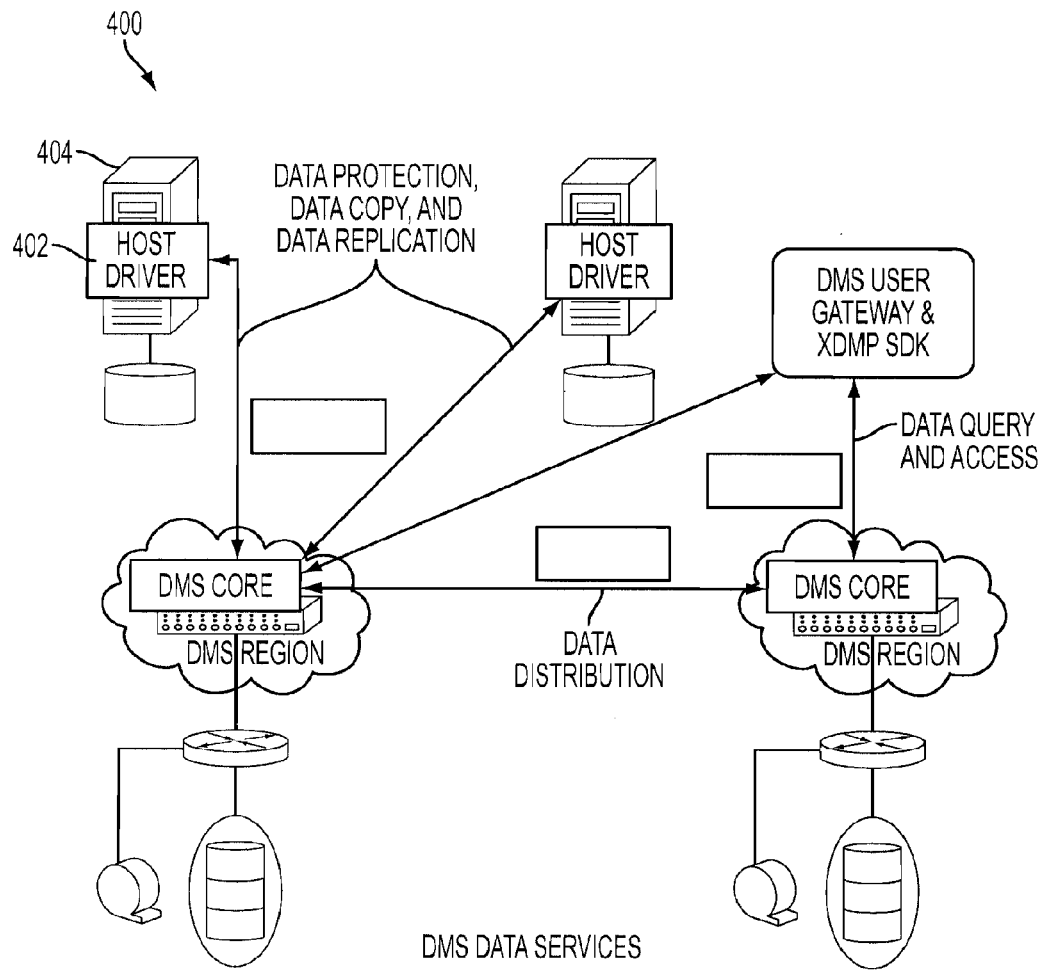
FIG. 4 illustrates how a data management system may be used to provide one or more data services.

Referring now to FIG. 4, an illustrative DMS network 400 provides a wide range of business continuity data services to data sources associated with a set of application host servers. As noted above, and as will be described in more detail below, the DMS host driver 402 embedded in an application server 404 connects the application and its data to the DMS cluster. In this manner, the DMS host drivers can be considered as an extension of the DMS cloud reaching to the data of the application servers. As illustrated in FIG. 4, the DMS network offers a wide range of data services that include, by way of example only: data protection (and recovery), disaster recovery (data distribution and data replication), data copy, and data query and access. The data services and, in particular, data protection and disaster recovery, preferably are stream based data services where meaningful application and data events are forwarded from one end point to another end point continuously as a stream. More generally, a stream-based data service is a service that involves two end points sending a stream of real-time application and data events. For data protection, this means streaming data from a host data source (e.g., an external host server) into a DMS cluster, where the host data source and its entire history can be captured and protected. Data distribution refers to streaming a DMS data source from one DMS cluster into another DMS cluster, while data replication refers to streaming a DMS data source from a DMS cluster to another external host server. Preferably, both data distribution and data replication are real-time continuous movement of a data source from one location to another to prepare for disaster recovery. Data replication differs from data distribution in that, in the latter case, the data source is replicated within the DMS network where the history of the data source is maintained. Data replication typically is host based replication, where the continuous events and changes are applied to the host data such that the data is overwritten by the latest events; therefore, the history is lost. Data copy is a data access service where a consistent data source (or part of a data source) at any point-in-time can be constructed and retrieved. This data service allows data of the most current point-in-time, or a specific point-in-time in the past, to be retrieved when the data is in a consistent state. These data services are merely representative.

The DMS provides these and other business continuity data services in real-time with data and application awareness to ensure continuous application data consistency and to allow for fine grain data access and recovery. To offer such application and data aware services, the DMS has the capability to capture fine grain and consistent data. As will be illustrated and described, a given DMS host driver uses an I/O filter to intercept data events between an application and its primary data storage. The host driver also receives data and application events directly from the application and database.

Figure 5:
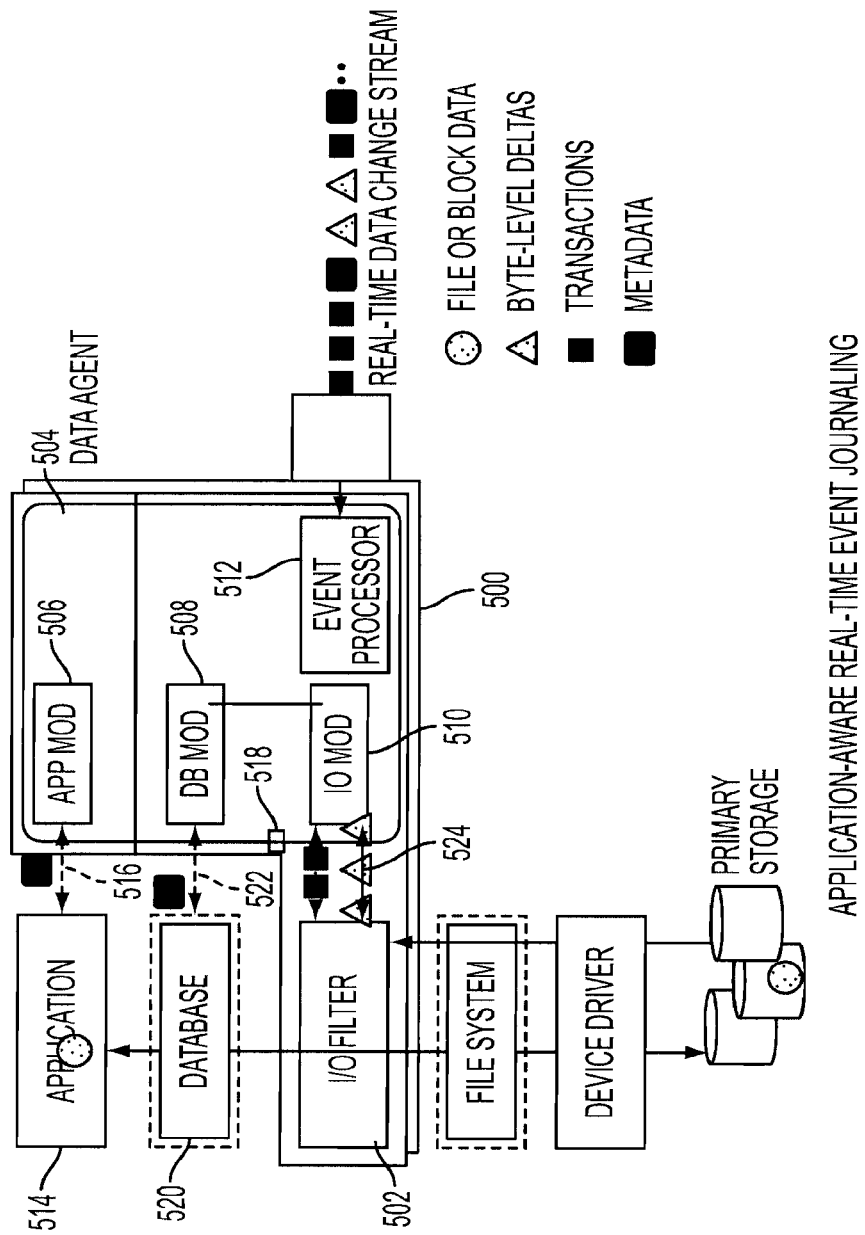
FIG. 5 is a representative host driver having an I/O filter and one or more data agents.

Referring now to FIG. 5, an illustrative embodiment is shown of a DMS host driver 500. As noted above, the host driver 500 may be embedded in the host server where the application resides, or in the network on the application data path. By capturing data through the application, fine grain data is captured along with application events, thereby enabling the DMS cluster to provide application aware data services in a manner that has not been possible in the prior art.

In this embodiment, a host server embedded host driver is used for illustrating the driver behavior. In particular, the host driver 500 in a host server connects to one of the DMS nodes in a DMS cluster (in a DMS region) to perform or facilitate a data service. The host driver preferably includes two logical subsystems, namely, an I/O filter 502, and at least one data agent 504. An illustrative data agent 504 preferably includes one or more modules, namely, an application module 506, a database module 508, an I/O module 510, and an event processor or event processing engine 512. The application module 506 is configured with an application 514, one or more network devices and/or the host system itself to receive application level events 516. These events include, without limitation, entry or deletion of some critical data, installation or upgrade of application software or the operating system, a system alert, detecting of a virus, an administrator generated checkpoint, and so on. One or more application events are queued for processing into an event queue 518 inside or otherwise associated with the data agent. The event processor 512 over time may instruct the application module 506 to re-configure with its event source to capture different application level events.

If an application saves its data into a database, then a database module 508 is available for use. The database module 508 preferably registers with a database 520 to obtain notifications from a database. The module 508 also may integrate with the database 520 through one or more database triggers, or it may also instruct the database 520 to generate a checkpoint 522. The database module 508 also may lock the database 520 (or issue a specific API) to force a database manager (not shown) to flush out its data from memory to disk, thereby generating a consistent disk image (a binary table checkpoint). This process of locking a database is also known as "quiescing" the database. An alternative to quiescing a database is to set the database into a warm backup mode. After a consistent image is generated, the database module 508 then lifts a lock to release the database from its quiescent state. The database events preferably are also queued for processing into the event queue 518. Generalizing, database events include, without limitation, a database checkpoint, specific database requests (such as schema changes or other requests), access failure, and so on. As with application module, the event processor 512 may be used to re-configure the events that will be captured by the database module.

The I/O module 510 instructs the I/O filter 502 to capture a set of one or more I/O events that are of interest to the data agent. For example, a given I/O module 510 may control the filter to capture I/O events synchronously, or the module 510 may control the filter to only capture several successful post I/O events. When the I/O module 510 receives I/O events 524, it forwards the I/O events to the event queue 518 for processing. The event processor 512 may also be used to re-configure the I/O module 510 and, thus, the I/O filter 502.

The event processor 512 functions to generate an application aware, real-time event journal (in effect, a continuous stream) for use by one or more DMS nodes to provide one or more data services. Application aware event journaling is a technique to create real-time data capture so that, among other things, consistent data checkpoints of an application can be identified and metadata can be extracted. For example, application awareness is the ability to distinguish a file from a directory, a journal file from a control or binary raw data file, or to know how a file or a directory object is modified by a given application. Thus, when protecting a general purpose file server, an application aware solution is capable of distinguishing a file from a directory, and of identifying a consistent file checkpoint (e.g., zero-buffered write, flush or close events), and of interpreting and capturing file system object attributes such as an access control list. By interpreting file system attributes, an application aware data protection may ignore activities applied to a temporary file. In general, application aware event journaling tracks granular application consistent checkpoints; thus, when used in conjunction with data protection, the event journal is useful in reconstructing an application data state to a consistent point-in-time in the past, and it also capable of retrieving a granular object in the past without having to recover an entire data volume. In the DMS, data protection typically begins with an initial upload phase, when a full copy of a host data source is uploaded to a DMS cluster. During and after the upload is completed, application(s) may continue to update the data, in which case event journals are forwarded to the DMS as data is modified. Further details of the event journaling technique are described in commonly-owned, U.S. Pat. No. 7,565,661, issued Jul. 21, 2009, which is incorporated herein by reference.

Figure 6A:
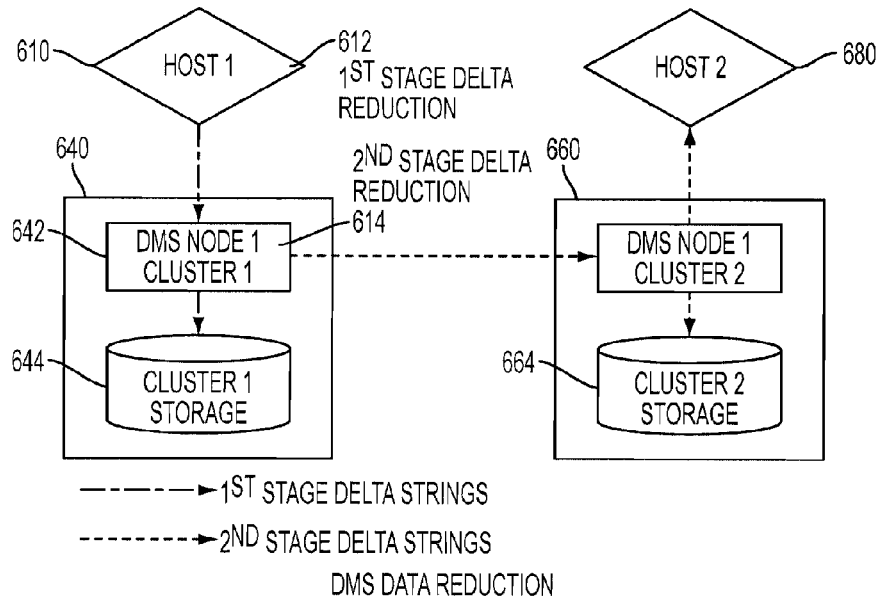
FIG. 6A illustrates how DMS provides a multi-stage data reduction according to an embodiment of the present invention.

With the above as background, the multi-stage data reduction process of the present invention can now be described. A preferred multi-stage data reduction has a first stage, and a second stage. Typically, a first-stage data reduction takes place at a given host driver, whereas a second-stage data reduction takes place at a given DMS node of a given DMS cluster at which the first-stage data is delivered initially. This approach (which is not to be taken by way of limitation) is illustrated diagrammatically in FIG. 6A. In this drawing, which is merely representative of one implementation, there is a host driver 610 connected to a DMS cluster 640 (Cluster 1) that comprises at least one DMS node 642 and a DMS cluster storage 644. DMS cluster 660 (Cluster 2) comprises at least one DMS node 662 and a DMS cluster storage 664. A second host driver 680 connects to the DMS node 662. According to the invention, a first-stage data reduction preferably takes place within a given host driver, such as host driver 610 and, in particular, as the host driver collects updated data. The first-stage data reduction is performed by a first-stage data reduction module 612, which is preferably implemented as software code (a set of computer instructions) that comprises part of the event processor in the host driver. Preferably, and as will be described, the first-stage data reduction module uses a signature based algorithm to extract changed data ranges, although this is not a limitation of the invention. For a given file, the changed data ranges are called a first-stage delta string. The first-stage data reduction module 612 then forwards the first-stage delta string to the DMS node 642, which includes a second-stage data reduction module 614 that, with takes a given first-stage delta string and compares it against the original binary file to generate a second-stage delta string together with a "sparse index" that is useful to enable instant "any point-in-time" retrieval of data. In particular, the second stage data reduction module 614 compares the given first-stage delta string to the actual data (of a previous version) stored (for example) in the cluster store 644, and it (the second stage data reduction module) then preferably extracts the exact changed data bytes. In the event there is no previous version of the data in the DMS cluster, the second stage delta string thus would contain an entirely new data object. The second stage data reduction module preferably also generates a byte level index of the binary content for the given version. This is the sparse index. A given sparse index has one or more byte range indices. The exact changed bytes extracted are the second-stage delta strings. A set of changed data ranges is the second-stage delta string. The second-stage delta string and its associated sparse index are then saved to persistent storage (e.g., the cluster store 644) and forwarded to other DMS nodes or other application hosts as needed or desired.

As data is changed in the protected host server, a new version of the data is created. This version, however, need not actually be stored in the DMS cluster, as will now be seen with reference to FIG. 6B. In the embodiment, the DMS cluster supports a novel DMS data history data structure 692 in the form of a flat file comprising a binary baseline file object (bfile) 694, a delta file (dfile) 696, and a set of one or more metadata blocks 698. The metadata blocks include an anchor metadata block 698*a*, a working version metadata block 698*b*, and one or more version metadata blocks preferably organized in reverse order of creation (in this illustrative example there are three versions, so that there are three metadata blocks 698*c*, 698*d*, and 698*e*). The anchor metadata block 698*a* stores meta-information of the data object that does not change over time, such information being, for example, the creation data and time. A version metadata block typically contains metadata (e.g., name, size, date version created, date version terminated, access control list (ACL), identity of entity who changed the data, and so forth) that can change over time, as well as the sparse index for that version. As noted above, the sparse index enables reconstruction of the binary content of the particular version for the duration of that version. As will be illustrated in more detail below, and as indicated by the arrows, a given sparse index in a given version metadata block has one or more indices; typically, those indices reference byte ranges in both the bfile 694 and the dfile 696 to facilitate reconstruction of the point-in-time instant of the content. The working metadata version block 698*c* is the newest version in process, e.g., as a given host driver is updating and/or before the host driver (or other control mechanism) issues a "make new version" command. The bfile data object 694 preferably contains the full copy of the initial content, and the dfile object preferably contains a sequence (e.g., a concatenation) of second-stage delta strings.

Figure 6B:
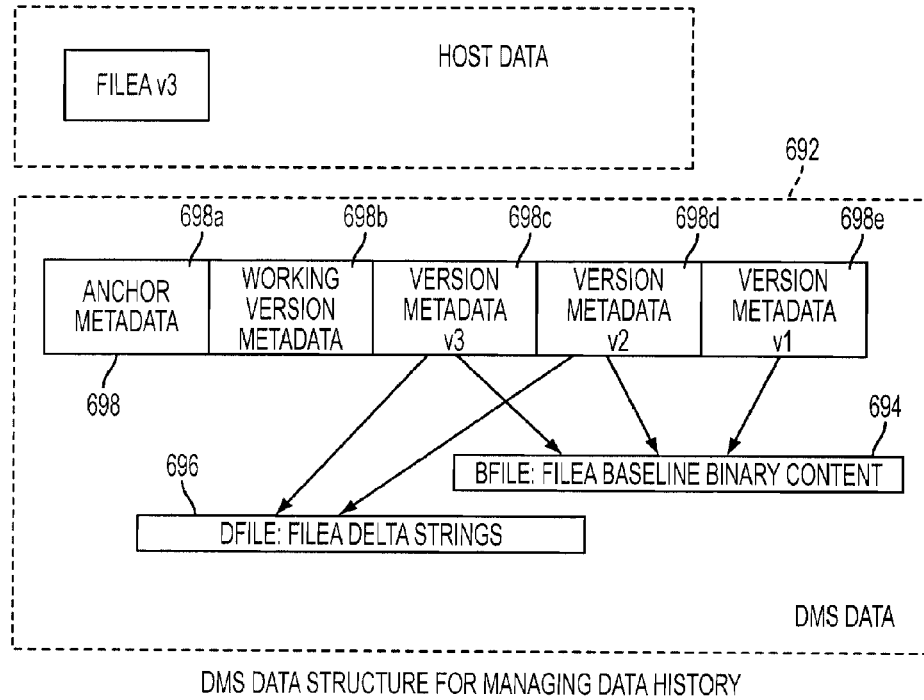
FIG. 6B illustrates a preferred DMS data structure for managing data history according to the present invention.

By structuring the data history object in the manner illustrated in FIG. 6B, when an update arrives, all that is required is to create the new version metadata (which includes a new sparse index and, as noted above, preferably takes place in the working metadata block 698c), and append the associated second-stage delta string to the dfile 696. Importantly, there is no requirement or need to store the contents of the new version, or even the first-stage delta strings generated from the changed version. By using the bfile and dfile objects (the latter including a sequence of second-stage data strings) and reverse ordering the version metadata in the manner illustrated, i.e., by laying this logical structure onto a physical disk, significant file I/O efficiencies are achieved. In particular, by growing the metadata string from the front, file write and read operations become much more efficient.

As an example, if a user file is 10K bytes in length but the update involves just 2 bytes, a typical application would write an entire file locally; in the DMS, however, only the associated new metadata (which includes the new sparse index) is written to disk along with the second-stage delta string (that represents the 2 bytes). As additional updates occur, each subsequent new version is managed in the same way, i.e., without storing (in DMS) the actual binary content of the update and with only the simple creation of new metadata (including the new sparse index) and additional sequencing of the dfile. When it comes time to reconstruct a given version, the layout of the flat file (with the metadata version blocks preferably reverse ordered) provides for efficient file read operation. In particular, during the read, the actual data bytes are located using the sparse indices (of that version), which point to information in the bfile and dfile as needed. The information in the bfile and dfile is then used to create the version under reconstruction.

Thus, according to the present invention, a given version (an updated file) need not be stored in the DMS cluster; rather, as long as the bfile, the dfile and the sparse index (for that version) exist, the actual contents of the version can be reconstructed efficiently and reliably.

As noted above, preferably the first-stage data reduction uses a signature-based algorithm to extract changed data ranges instead of comparing the current changes to the previous data version. This operation minimizes both bandwidth utilization and storage overhead. A convenient algorithm to perform the first-stage data reduction operation is Rsync, which is available as an open source implementation from several online locations, e.g., http://samba.anu.edu.au/rsync/. In an alternative embodiment, or if bandwidth is not a concern, the first-stage data reduction can operate by using any delta differencing algorithm that merely compares the current changes to the previous data version. More generally, any known or later-developed checksum-based delta extraction algorithm may be used.

As noted above, an important goal of the present invention is to reduce significantly the amount of storage required for storing data history in an environment where data is consistently changing and the data must be available over a wide area. As will be seen, this goal is achieved by the present invention through the combination of the first-stage and second-stage data reduction, especially where the latter data reduction step is associated with a sparse indexing technique. This multi-stage data reduction ensures that only minimal storage is required for storing data history and that only minimal wide-area-network bandwidth is required for distribution and replication.

The first and second stage data reduction is now illustrated. In an illustrated embodiment, each version of a binary object (such as a file or a database volume) in the DMS has an associated sparse index in their version metadata defined by the following syntax:

| | |
|---|---|
| Sparse index syntax: | [array of ((start byte-end byte: filename offset length)\| start byte-end byte: pattern size patternString))] |

In addition, according to the invention, preferably each version (other than the first version) of the binary file also has an associated first stage delta string, together with an associated second stage delta string. As each version of a binary file is generated (typically in the host server), a data reduction method is implemented to generate the first stage delta string and the second stage delta string. Further, as each version of a binary file is generated (preferably at the DMS), the resulting second stage delta string is concatenated into a composite stream, which was identified above as the delta file (dfile). The dfile contains a sequence of second-stage delta strings. When there is only one changed version, the delta file includes just one (or one or more related) second stage delta string(s). However, as additional versions are created, the delta file becomes a composite of the second stage delta strings (i.e., it includes all the second-stage delta strings for all the version updates). The dfile is a highly compact encoding of the version differences, as will be seen below. As described above in connection with FIG. 6B, only the delta file and its associated sparse index are stored (together with the binary file) in a backend store (e.g., the cluster). This minimizes storage overhead, as well as I/O and network bandwidth utilization.

The following table describes a representative delta string syntax that may be implemented to generate the first and second stage delta strings according to the present invention:

| Delta string syntax | Descriptions |
|---|---|
| + offset length data | Insert data of the given length at the given offset |
| − offset length | Delete data of the given length from the given offset |
| R offset oldLength newLength data | Replace old data starting from the given offset of the given oldLength with the new data of the given newLength |
| R offset oldLength newLength dataPointer | Replace old data starting from the given offset of the given oldLength with the new data of the given newLength located at the given dataPointer |

The above-described syntax should not be taken to limit the present invention. Any syntax that defines given data insertions, deletions, replacements or other data comparison operations may be used.

The application of the above-identified syntax according to the present invention can be illustrated by way of example. Assume that the original data range stored in the host server (e.g, cluster 644 of FIG. 6A) is the content "aaaabbbb." For purposes of illustration, content is uploaded to the DMS, and a binary baseline file object (bfile) is created to hold this content. The contents of the binary file (bfile) then comprise Version 1. Now, at a first given time, assume that a new data range is available, e.g., through an update from host driver 610 of FIG. 6A, as the content string "aaaaxxbbbb." For purposes of illustration, when this content is protected at the DMS, a Version 2 is said to exist. Note that the bfile itself (the baseline or original content uploaded to the DMS) does not change when Version 2 is created. The new version may be created at the same location at which the original version was created, or from any other location in the data management system. Assume further that, at a second given time (later than the first given time), the file changes again at the host server, e.g., to the following content: "aayyzxxbbbb," which (when protected at the DMS) is considered to be Version 3. Once again, the bfile does not change. The multi-stage data reduction technique of the present invention processes these content strings through the data reduction modules and generates an associated sparse index for each version, such as now described.

By way of example only, the following chart assumes that each content character in the example represents 100 bytes and that the signature-block size used by the first-stage data reduction checksum based algorithm is 400 bytes. This means that a checksum is generated for each 400 bytes of data. It is also assumed that each delta string symbols (+, −, R) representation is 1 byte and that the offset and length are 4 byte numbers.

| | |
|---|---|
| Version 1: | Binary file (bfile): aaaabbbb<br>Version 1 Sparse index:<br>0-799: bfile 0 800<br>Note: at the DMS cluster the Version 1 Sparse index is stored in the Version 1 metadata block. At this point, there is no dfile. A bfile is created to store the initial baseline content of the file. |
| Version 2: | $1^{st}$ stage delta string: +400 200 "xx"<br>$2^{nd}$ stage delta string: +400 200 "xx"<br>Version 2 content is: aaaaxxbbbb<br>Binary file (bfile): aaaabbbb<br>Delta file (dfile): +400200xx<br>Version 2 Sparse index:<br>0-399: bfile 0 400<br>400-599: dfile 9 200<br>600-999: bfile 400 400<br>Note: when the content of the file is modified at the host server to "aaaaxxbbbb," a first stage delta string is generated at the host server. A second-stage delta string is generated at the DMS cluster. Thereafter, a dfile is created to hold the second-stage delta string, and the Version 2 Sparse index is created and stored in the Version 2 metadata block. The second-stage delta string represents "an insertion to Version 1 content at offset 400 and length 200 bytes long whose value is 'xx'". |
| Version 3: | $1^{st}$ stage delta string: R 0 400 500 "aayyz"<br>$2^{nd}$ stage delta string: R 200 200 300 "yyz"<br>Version 3 content is: aayyzxxbbbb<br>Binary file (bfile): aaaabbbb<br>Delta file (dfile): +400200xxR200200300yyz<br>Version 3 Sparse index:<br>0-199: bfile 0 200<br>200-499: dfile 221 300<br>500-699: dfile 9 200<br>700-1099: bfile 400 400<br>Note: when the content of the file is modified once more at the host server (from aaaaxxbbbb to aayyzxxbb), a first stage delta string is generated at the host server, and a second stage delta string is generated at the DMS cluster. Thereafter, the new second-stage delta string is appended to the dfile, and the Version 3 Sparse index is created and stored in the Version 3 metadata block. The second-stage delta string represents "a replacement of Version 2 content at offset 200 and length 200 bytes by the new 300 bytes of data 'yyz'". |

As can be seen, the delta file (dfile) is a string into which the second stage delta reduction strings are concatenated as new versions are created. This is a forward delta encoding format. Stated another way, the delta file becomes a "composite" string (or stream) over time, with highly compact encoding. In this example, after Version 3 has been generated, the delta file is a composite of the two (2) second stage delta strings, viz., +400200xx|R200200300yyz.

As can also be seen, a sparse index associated with a given version is a byte range description of the particular version of the file (i.e., the version that exists at a given point in time). Stated another way, the delta file and the associated sparse index enable the system to determine byte level contents of each version of the file at any given point-in-time. Thus, the encoding techniques described by the present invention facilitate any point-in-time "on-demand" recovery of the data.

The above-described examples show one delta string being produced for each version change. This is not a limitation. In practice, typically a new file update may result in one or more delta strings being generated. In addition, the number of first stage delta strings need not be the same as the number of second stage delta strings for a given update.

Thus, in the DMS cluster (and in this example), Version 2 generates a first stage delta string of "+400 200 'xx'," which indicates that the data "xx" is of length 400 and is inserted at a given offset 200. The second stage delta string has a similar value, as typically an "insertion" does not reduce the size of the first stage delta string. As can be seen, the Version 2 sparse index corresponds to the Version 2 content (with "+" being one byte, and both 400 and 200 being 4 byte numbers). In particular, the Version 2 sparse index identifies that the first four character positions (byte range 0-399) of the Version 2 content are found in the original binary file (bfile); that the next 2 characters (byte range 400-599) of the Version 2 content are found in the delta file for this version at offset "9" (in this encoding "+" is represented as 1 byte and both "400" and "200" are represented as 4 byte numbers so that +400200 represents "9"); and that the final four character positions (byte range 600-999) of the Version 2 content are found in the original binary file (bfile) in the final four character positions of that file. Thus, as can be seen, the sparse index provides byte level descriptions from which the actual data comprising the Version 2 content can be reconstructed.

With Version 3, the first stage delta string reflects a replace function R, in this case that the new data (aayyz) is of length 500 and is replacing old data (aaaa) of length 400 at a given offset (0) (at the front of the binary file). The second stage delta string is then generated by comparing the first stage delta string R 0 400 500 "aayyz" with the original binary string to create a further reduced string, in this case a string that reflects that new data (yyz) is of length 300 and is replacing old data (aa) of length 200 at a given offset (200). Once again, the Version 3 sparse index provides the byte range descriptions of the Version 3 content. Thus, the first two characters (byte range 0-199) are from the original binary file at the positions indicated, the next three characters (byte range 200-499) are identified from the composite delta file (dfile) at the identified offset, the next two characters (byte range 500-699) are identified from the composite delta file at the identified offset, and then the final characters (byte range 700-1099) are identified from the original binary file as indicated.

As can be seen, in the host server a large portion of a file or a database may be modified, while at the DMS typically only a small amount of data is written to the storage. Moreover, as noted above, the data written to storage is typically just new metadata (including the sparse index for the version) and a new sequence (the one or more second-stage delta strings) appended to the dfile. To generate a new sparse index, only the last version of the sparse index needs to be retrieved and modified according to the semantics indicated in the new second-stage delta string(s). As compared to the host server, however, only a very small amount of storage and I/O bandwidth is used in the DMS.

Of course, the above-identified description is merely representative of the desired encoding properties provided by the second stage delta string and the associated sparse index. The specific examples are not meant to limit the present invention in any way.

The following table illustrates several additional examples of how the delta string syntax is used to generate representative first stage and second stage delta strings:

| Original Data Range | New Data Range | First Stage Delta String | Second Stage Delta String |
|---|---|---|---|
| aaaabbbb | aaaaxxbbbb | +400 200 "xx" | +400 200 "xx" |
| aaaabbbb | aaaaxxbb | R 400 400 400 "xxbb" | R 400 200 200 "xx" |
| aaaabbbb | aabbbb | R 0 400 200 "aa" | −200 200 |
| aaaabbbb | aacbbc | R 0 400 300 "aac" | R 200 200 100 "c" |
| | | R 300 400 300 "bbc" | R 500 200 100 "c" |
| aaaabbbb | aaaabb | R 400 400 200 "bb" | −600 200 |

Figure 7:
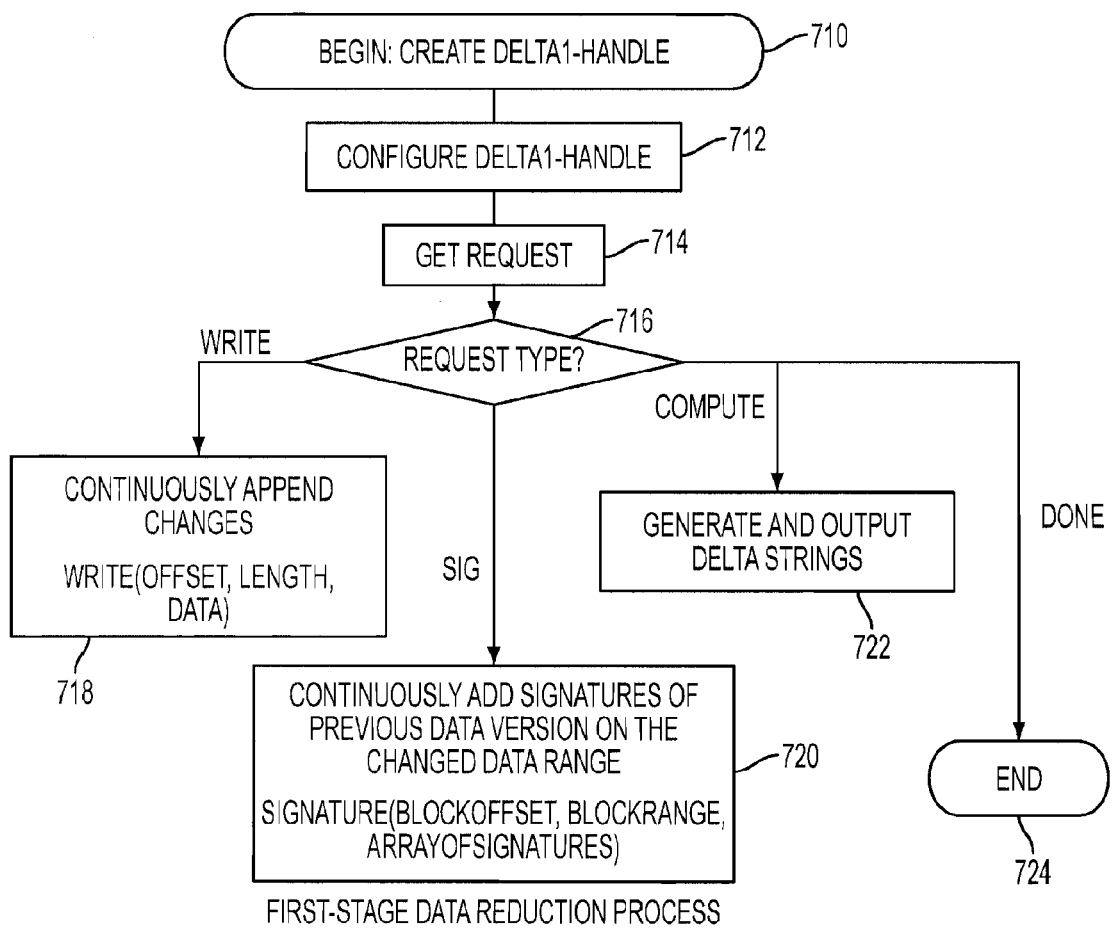
FIG. 7 is a high level process flow diagram illustrating a first-stage delta reduction.

FIG. 7 is a process flow diagram of an illustrative operation of the first-stage data reduction module. Preferably, this process is embedded in the event processing engine of the host driver, although this is not a limitation of the present invention. When a data object is opened for update or when the first update to a data object arrives, the event processing engine creates a first-stage delta reduction handle. This is step 710. This operation is the beginning of the first stage delta reduction process for the data object. In the flow diagram, a handle to the first-stage delta reduction process is called Delta1-Handle. As the Delta1-handle (a memory allocation) is created, it can be configured in step 712 to use any specific algorithm for calculating deltas. As noted above, one possible algorithm is Rsync, which tries to use checksums (signatures) to match a byte range; if there is no match, the algorithm performs byte shifting until it locates another common byte range. This algorithm can detect byte insertion, byte deletion, and byte modification. For some cases, however, when the update pattern of an application does not include byte insertion and deletion (such as the write behavior of a database), then this algorithm is not efficient. In such case (i.e., for applications that do not perform byte insertion and deletion), a simple checksum matching algorithm that does not perform byte shifting would be more efficient to calculate changed byte ranges. Of course, any convenient delta extraction algorithm can be used for the first stage data reduction.

Once configured, the Delta1-handle continues to accept requests from the host driver. This is step 714. At step 716, a test is performed to determine the request type. If the request type is a WRITE request (a request to accumulate updated data) in the form of WRITE (offset, length, data), the routine branches to step 718. At this step, any data changes to the version are accumulated. If the request type is SIGNATURE request (a request to accumulate the signatures from the last version for delta computation in the form of SIGNATURE (blockOffset, blockRange, arrayofSignatures), the routine branches to step 720. At this step, the signatures of the previous data version that are relevant to the changes are accumulated. As will be described in more detail below, the host driver can determine if the needed signatures are available with the delta1-handle; if not, the host driver preferably obtains the signature from the DMS core. Once changes are completed (typically upon a checkpoint event) and the relevant signatures of the last version are acquired, the routine performs a COMPUTE function at step 722 using the data changes and the signatures as needed. This generates the first stage delta string. Once the first-stage delta strings are generated, the host driver can forward those delta strings to the DMS core and terminate the process, which is indicated by step 724.

Figure 8:
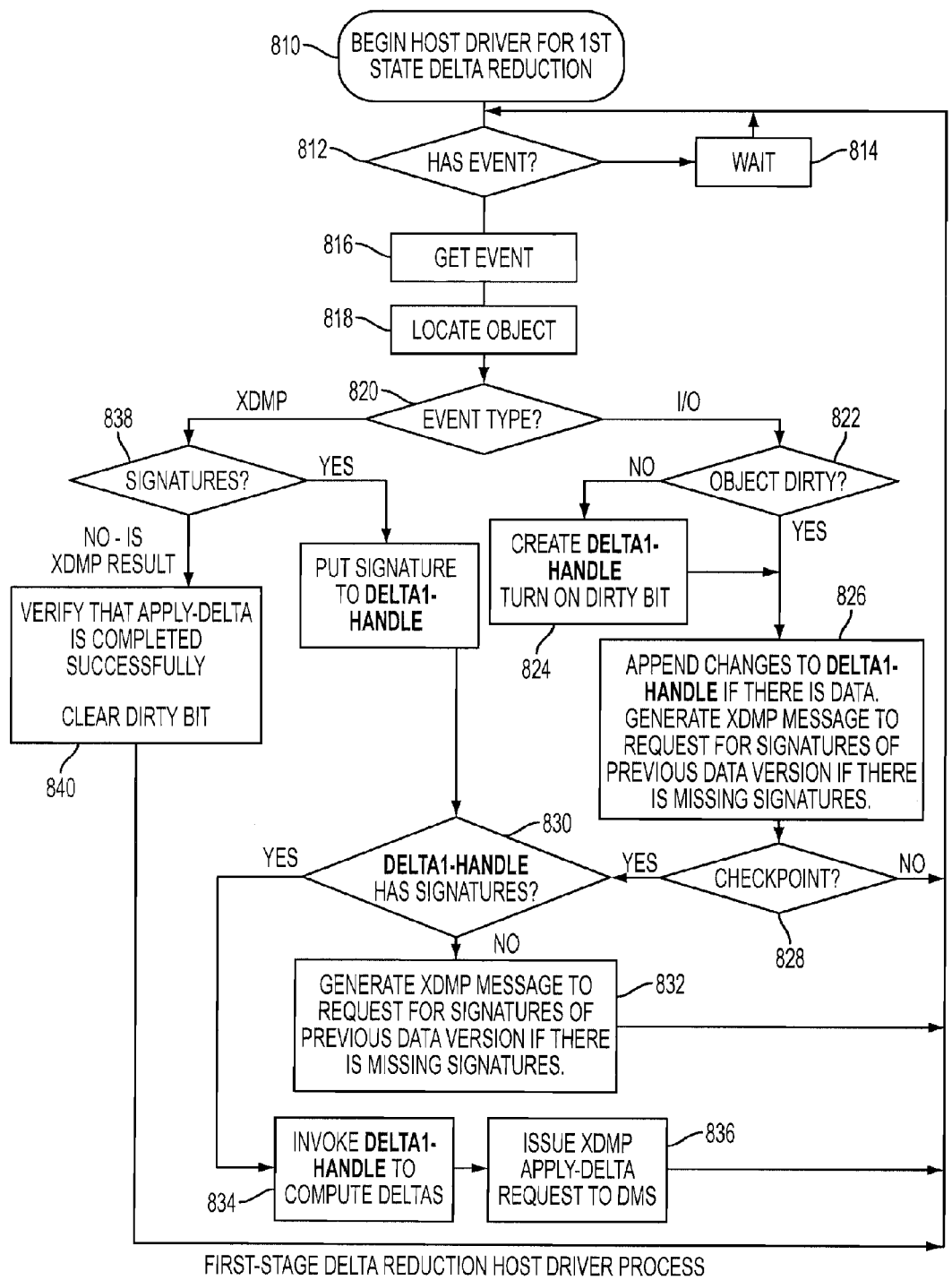
FIG. 8 is a more detailed process flow diagram illustrating a representative host driver operation during the first-stage delta reduction.

FIG. 8 is a flowchart illustrating the operation of the host driver event processing engine with respect to the first stage data reduction. The host driver event processing engine in this example uses a first level data reduction module. The routine begins at step 810 when the host driver event processing engine begins processing events from the raw event queue. At step 812, the routine performs a test to determine if there is a raw event on the event. If not, the routine branches to the wait state at step 814 and cycles. If the outcome of the test at step 812 is positive, the routine continues at step 816 by dequeuing the event from the event queue and, at step 818, locating an associated data object on the sorted source tree. At step 820, a test is made to evaluate the event type. If the result of the test at step 820 indicates that the event is a data transport protocol (XDMP) event, the routine branches to the left portion of the process flow; if the result of the test at step 820 indicates that the event is an I/O event, the routine branches to the right portion of the process flow. In the latter case, the routine continues at step 822 to determine whether the object is dirty (i.e., is this the first change to the object?). If the outcome of the test at step 822 indicates that the object is not dirty (it is the first change), the routine branches to step 824 to create the Delta1-handle (corresponding to step 710 in FIG. 7) and to turn "on" a dirty bit. (This starts the process described generally in the flowchart of FIG. 7). After performing step 824, or if the outcome of the test at step 822 is negative, the routine continues at step 826. At this step, the module appends the changes to the Delta1-handle if there is data (this is step 718 in FIG. 7). The module also generates a data transport protocol (XDMP) message (to the DMS core) to request signatures of previous data versions (if there are missing signatures). The routine then continues at step 828 to determine if a checkpoint (e.g., a flush, a close, a timeout, a database quiesce, or the like) has been reached. If not, the routine branches to back to step 812. If, however, a checkpoint has been reached, the routine continues at step 830 to test whether the Delta1-handle has any signatures. If no, the routine continues at step 832 to generate a data transport protocol (XDMP) message (to the DMS core) to request signatures of previous data versions (if there are missing signatures). Following step 832, the routine branches back to step 812. If the outcome of the test at step 830 is positive, the routine branches to step 834 to use the Delta1-handle to compute the delta values (this is step 722 in FIG. 7). The routine then issues a transport protocol (XDMP) message to forward to DMS the resulting first stage delta string. Control then returns back to step 812.

If the outcome of the test at step 820 indicates that the event type is XDMP, the routine performs a test at step 838 to determine if the response corresponds to a request for signatures and if signature(s) are available. If yes, the routine branches to step 839 to put the signature(s) into the Delta1-handle (as in step 718 in FIG. 7). Control then continues with step 830 as has been described. If the outcome of the test at step 838 indicates that the response does not correspond to a request for signatures or if signatures are not available (because, for example, the delta values have already been sent over to the backend data store), the routine continues at step 840 to verify that the first stage delta reduction is complete. This operation also occurs when the response corresponds to a delta-application request. At step 840, the routine also clears the dirty bit so that the object is now clean. Control then returns to step 812.

Figure 9:
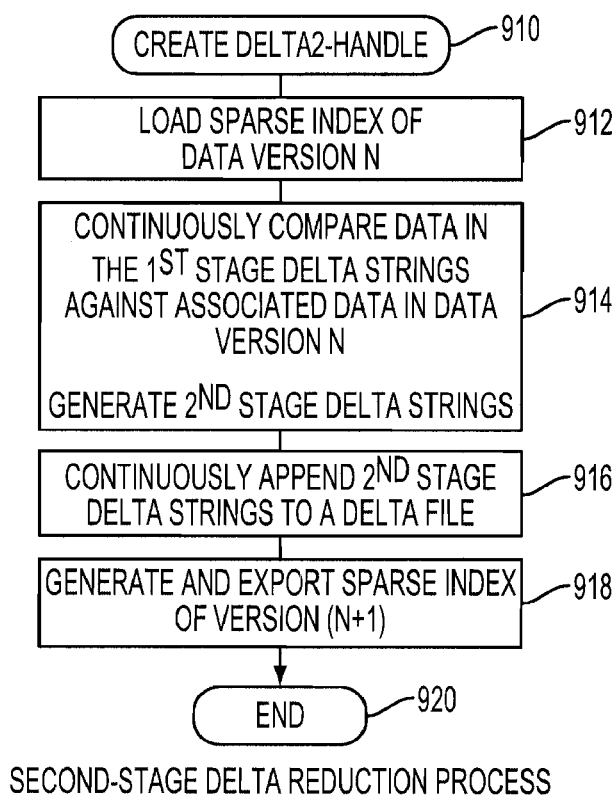
FIG. 9 is a high level process flow diagram illustrating a second-stage delta reduction according to the preferred embodiment of the present invention.

FIG. 9 illustrates a high level description of an operation of the second stage data reduction module with respect to a new version of a binary file (a version N+1). As noted above, preferably this process is carried out in an element of the DMS core, e.g., such as a data source object in a DMS node. The routine begins at step 900 with the creation of a second-stage delta reduction handle, called Delta2-handle, for the new version. Preferably, this operation is initiated when the event processing engine of the host driver issues a transport protocol (XDMP) request to apply one or more first stage delta strings. This step sets up a given memory allocation. At step 912, the routine loads the sparse index of data version N (a sparse index of a previous version). The routine then continues at step 914. At this step, the routine continuously compares data in the first stage delta string (or string(s) if there are more than one) against associated data in data version N to generate the second stage delta string. An example of this process was described above. At step 916, and as second stage delta strings are generated, the routine continuously appends the second stage delta string to create the delta file. The routine then continues at step 918 to generate and export the sparse index of version N+1 into the version metadata of the associated object. The process then terminates at step 920. As has been noted above, by only appending the second stage delta strings and exporting the metadata of the new version, the DMS storage and I/O bandwidth requirements are significantly lower than the actual I/O bandwidth at the primary storage associated with the host server.

The use of forward delta encoding in combination with the sparse index provide significant advantages of the prior art. In particular, the multi-stage delta reduction as has been described significantly reduces the amount of storage required for storing data history. As is known, a forward delta management system maintains an initial baseline of the file, as well as a list of deltas that come after the baseline. In a forward delta management system, deltas are always appended at a delta document sequentially. The advantage of such system is that, as deltas arrived, the system needs only to append the deltas to the tail end of a delta document. As applied in the present invention, a given DMS node can simply append the delta strings to a delta file as it provides a data protection service. The DMS system can also transfer the delta strings to other DMS nodes or external hosts to provide a data replication service. When a user tries to access a file (or when a host needs to recover its lost data at a specific point-in-time or the most current point-in-time), the DMS node must, at runtime, take the baseline of the file and then apply the necessary delta strings "on the fly" to generate the requested point-in-time data. As mentioned above, this process is quite difficult to accomplish in an efficient manner in the prior art because read latency is very high as the number of delta strings increases. The present invention, however, solves this problem by providing the associated sparse index. By using the sparse index, the DMS can identify the exact contents of a particular version of the file at any given point-in-time in a computationally-efficient manner. Moreover, because the invention uses significantly lower I/O bandwidth at the DMS (as compared to the I/O bandwidth requirements of the corresponding update at the host server), many servers can be protected (by DMS) concurrently. The present invention also allows the DMS nodes to perform data replication over local or wide area networks with minimal bandwidth.

Each of the first and second stage data reduction modules as described above are conveniently implemented as computer software, i.e., a set of program instructions and associated data structures. This is not a requirement of the invention, as the functionality described above (or any part thereof) may be implemented in firmware, in general purpose or special-purpose hardware, or in combinations of hardware and software.

While a multi-stage data reduction approach is desirable, this is not a limitation of the present invention. In an alternative embodiment, there are no second-stage delta strings, in which case only the first-stage delta strings are maintained with the sparse index. In yet another alternative embodiment, changes collected from the host are sent to the DMS without performing first-stage delta reduction, in which case the changes are compared against the previous data version in the DMS to generate delta strings and the sparse index.

Yet other variants are also within the scope of the present invention. Thus, while the delta file (dfile) has been described as a concatenation of the second stage delta strings (i.e., a stream), this is not necessarily a requirement of the invention. The second stage delta strings may be stored separately or otherwise disassociated from one another if desired.

While the present invention has been described in the context of a method or process, the present invention also relates to apparatus for performing the operations herein. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including an optical disk, a CD-ROM, a magnetic-optical disk, a read-only memory (ROM), a random access memory (RAM), a magnetic or optical card, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill also will appreciate that some of the functions may be combined or shared in given instructions, program sequences, code portions, and the like.

One of ordinary skill will also appreciate that the techniques of the present invention can be implemented in any data storage device or system, or across sets of such devices or systems. More generally, the present invention can be applied on a file system, on a raw volume, or with respect to any storage devices in which any logical or physical data structures are used.

What is claimed is:

1. A method for capturing and storing a data history of a file to enable reconstruction of versions of the file, comprising:
    storing a copy of a first version of a file;
    comparing with one or more computer processors, a second version of the file to the first version of the file, or the copy of the first version of the file, to generate one or more delta strings associated with the second version of the file;

generating a byte range index that refers to bytes in the copy of the first version of the file and to bytes in the one or more delta strings associated with the second version of the file;

wherein the byte range index references entire contents of the second version of the file;

storing the byte range index; and using the byte range index to enable reconstruction of the second version of the file without having to apply to the copy of the first version of the file the one or more delta strings associated with the second version of the file.

2. The method of claim 1 further comprising:

comparing an nth version of the file to an (n−1)th version of the file, or a copy of the (n−1)th version of the file, to generate one or more delta strings associated with the nth version of the file; and generating an nth byte range index that refers to bytes in the copy of the first version of the file, to bytes in the one or more delta strings associated with any of the second to (n−1)th versions of the file, and to bytes in the one or more delta strings associated with the nth version of the file.

3. The method of claim 2 further comprising:

using the nth byte range index to enable reconstruction of the nth version of the file without having to apply to the copy of the first version of the file the one or more delta strings associated with any of the second to nth versions of the file.

4. The method of claim 1 wherein comparing utilizes a signature-based algorithm that performs checksum-based delta extraction to generate the one or more delta strings.

5. The method of claim 1 wherein comparing comprises a first stage and a second stage, wherein the first stage generates a first, coarse data reduction and the second stage generates a second, more fine-grained data reduction.

6. The method of claim 5 wherein, during the first stage, a digital signature of a block of an nth version of the file is compared to a digital signature of a corresponding block of an (n−1)th version of the file to generate a delta string.

7. The method of claim 6 wherein, during the second stage, a digital signature of the block of the nth version is compared to a digital signature of the corresponding block of the (n−1)th version of the file to generate another delta string, where the block of the nth version that is processed during the second stage is smaller than the block of the nth version that is processed in the first stage.

8. The method of claim 1 wherein the byte range index comprises a set of one or more entries, each entry comprising a start byte-end byte sequence and a reference value that represents contents of the file within the start byte-end byte sequence.

9. The method of claim 8 wherein the reference refers to a data range of the copy of the first version of the file or any delta string of any version of the file.

10. The method of claim 8 wherein the reference refers to a content file associated with the file, an offset in the content file, and a length or end byte of the content file.

11. The method of claim 8 wherein the reference refers to a physical storage location.

12. The method of claim 1 wherein a given version of the file represents an application checkpoint, a user file save, or a file close.

13. An apparatus for capturing and storing a data history of a file to enable reconstruction of versions of the file, comprising:

computer hardware comprising one or more computer processors configured to:

store a copy of a first version of a file;

compare a second version of the file to the first version of the file, or the copy of the first version of the file, to generate one or more delta strings associated with the second version of the file;

generate a byte range index that refers to bytes in the copy of the first version of the file and to bytes in the one or more delta strings associated with the second version of the file;

wherein the byte range index references entire contents of the second version of the file;

store the byte range index; and use the byte range index to enable reconstruction of the second version of the file without having to apply to the copy of the first version of the file the one or more delta strings associated with the second version of the file.

14. The apparatus of claim 13 wherein the computer hardware is further configured to:

compare an nth version of the file to an (n−1)th version of the file, or a copy of the (n−1)th version of the file, to generate one or more delta strings associated with the nth version of the file; and generate an nth byte range index that refers to bytes in the copy of the first version of the file, to bytes in the one or more delta strings associated with any of the second to (n−1)th versions of the file, and to bytes in the one or more delta strings associated with the nth version of the file.

15. The apparatus of claim 14 wherein the computer hardware is further configured to:

use the nth byte range index to enable reconstruction of the nth version of the file without having to apply to the copy of the first version of the file the one or more delta strings associated with any of the second to nth versions of the file.

16. The apparatus of claim 13 wherein comparing utilizes a signature-based algorithm that performs checksum-based delta extraction to generate the one or more delta strings.

17. The apparatus of claim 13 wherein comparing comprises a first stage and a second stage, wherein the first stage generates a first, coarse data reduction and the second stage generates a second, more fine-grained data reduction.

18. The apparatus of claim 17 wherein, during the first stage, a digital signature of a block of an nth version of the file is compared to a digital signature of a corresponding block of an (n−1)th version of the file to generate a delta string.

19. The apparatus of claim 18 wherein, during the second stage, a digital signature of the block of the nth version is compared to a digital signature of the corresponding block of the (n−1)th version of the file to generate another delta string, where the block of the nth version that is processed during the second stage is smaller than the block of the nth version that is processed in the first stage.

20. The apparatus of claim 13 wherein the byte range index comprises a set of one or more entries, each entry comprising a start byte-end byte sequence and a reference value that represents contents of the file within the start byte-end byte sequence.

* * * * *